United States Patent
Becker et al.

(10) Patent No.: US 7,099,238 B1
(45) Date of Patent: Aug. 29, 2006

(54) METHOD OF REPRODUCING DATA IN WHICH AN ACCELERATED SELECTION MAY BE POSSIBLE OF STORAGE MEDIA TO BE REPRODUCED OR TO BE REJECTED BY A PLAYBACK DEVICE

(75) Inventors: Volker Becker, Hildesheim (DE); Holger Zimmermann, Hildesheim (DE); Dieter Baas, Auenheim (DE)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 10/111,856

(22) PCT Filed: Oct. 27, 2000

(86) PCT No.: PCT/DE00/03789

§ 371 (c)(1), (2), (4) Date: Aug. 27, 2002

(87) PCT Pub. No.: WO01/33567

PCT Pub. Date: May 10, 2001

(30) Foreign Application Priority Data

Oct. 30, 1999 (DE) .............................. 199 52 362

(51) Int. Cl.
*G11B 21/08* (2006.01)

(52) U.S. Cl. ............................... 369/30.23; 369/30.04

(58) Field of Classification Search ............. 369/30.01, 369/30.03, 30.04, 30.06, 30.18, 30.2, 30.27, 369/30.28, 30.3, 30.32, 30.64, 47.32, 124.08
See application file for complete search history.

(56) References Cited

U.S. PATENT DOCUMENTS

| | | |
|---|---|---|
| 5,199,019 A | 3/1993 | Matsumura et al. |
| 5,766,018 A | 6/1998 | Terashima |

FOREIGN PATENT DOCUMENTS

| | | |
|---|---|---|
| DE | 197 00 643 | 7/1998 |
| DE | 199 19 032 | 11/2000 |
| EP | 0 777 106 | 6/1997 |
| EP | 0 926 644 | 6/1999 |
| JP | 59 180853 | 10/1984 |
| JP | 03 150765 | 6/1991 |
| JP | 05 334805 | 12/1993 |
| WO | WO 98 26417 | 6/1998 |

OTHER PUBLICATIONS

Blaupunkt Catalog, Sound und Fahrvergnugen pur (Sound And Driving Pleasure To The Max)., Program 96/97.

*Primary Examiner*—Paul W. Huber
(74) *Attorney, Agent, or Firm*—Kenyon & Kenyon LLP

(57) ABSTRACT

A method for the reproduction of data, such as digital audio data and/or video data, stored on a storage medium, for example, on an optical storage disk, in a playback device, in which an accelerated selection may be possible of storage media to be reproduced or to be rejected by playback device. In a first operating mode, data are filed in, for example, a nonvolatile memory during a play-back process of the storage medium. In a second operating mode, the storage medium is selected, for example, for a playback process and a reproduction process. Within a timespan during which the selected storage medium is brought from a magazine into a playback position, in which the data stored in the storage medium may be read out by a read device, or into an eject position, from which the selected storage medium may be retrieved, at least a part of the data filed in the memory is played back and reproduced.

17 Claims, 2 Drawing Sheets

METHOD OF REPRODUCING DATA IN WHICH AN ACCELERATED SELECTION MAY BE POSSIBLE OF STORAGE MEDIA TO BE REPRODUCED OR TO BE REJECTED BY A PLAYBACK DEVICE This application is a 371 of PCT/DE00/03789, filed Oct. 27, 2000.

FIELD OF THE INVENTION

The present invention relates to a method for reproducing data stored on a storage medium.

BACKGROUND INFORMATION

From the Blaupunkt catalog, "Sound und Fahrvergnüfgen pur.(Sound and Driving Pleasure to the Max). Mobile Kommunikation von Blaupunkt (Mobile Communication from Blaupunkt). Programm (Program) '96/'97", for example, compact disk changer CDC-FO5 is referred to, on which digital audio data stored on a compact disk may be played back on a playback device.

SUMMARY OF THE INVENTION

By contrast, it is believed that an exemplary method according to the present invention has an advantage that, in a first operating mode, data may be stored in, for example, a nonvolatile memory during a play-back process from the storage medium, that, in a second operating mode, the storage medium may be selected for a playback and reproduction process and that, within a timespan during which the selected storage medium is brought from a magazine into a playback position; in which the data stored in the storage medium may be read out by a read device, or into an eject position in which the selected storage medium can be retrieved from the playback unit or the magazine, at least a part of the data stored in the memory is played back and reproduced. In this manner, the waiting time to complete loading of the selected storage medium into the playback position or the eject position may be dispensed with, and the user may decide, on the basis of data reproduced during the loading process, whether to select another storage medium for playback and reproduction or for ejection. Thus, the operating process for the selection of a storage medium from the supply memory may be sped up. In the case of audio data of the selected storage medium stored in a nonvolatile memory, it may not be necessary, for example, to display the name of the selected storage medium on a display device. Rather, the user may decide, on the basis of the reproduction of the audio data, whether to select another storage medium. This is believed to be especially advantageous during use of an exemplary method according to the present invention in a vehicle, since the user may not have to avert his view from road traffic for selecting the storage medium, and thus his concentration may not be impaired.

It is believed to be advantageous that the at least one data group for storage in the first operating mode may be selected, using an operating unit, from any memory location on the storage medium. In this manner, the user may decide which location is to be played back for a choice of storage medium in the second operating mode. Thus, the storage of the appropriate data groups in the memory may be optimally adapted to the requirements of the user.

It is believed that a further advantage of an exemplary method according to the present invention is that the at least one data group for storage in the first operating mode may be selected from a predefined memory location on the storage medium. In this manner, the operator action for storage of the data groups in the first operating mode is automated, so that operating effort is considerably reduced for the user. It is believed that this has an advantage during use of an exemplary method according to the present invention in a vehicle in that the attention of the user may be distracted from road traffic in only a minor way.

It is believed to be advantageous that the storage location may be preselected depending on the frequency of reproduction of data groups of the storage medium played back before, so that the at least one data group of the preselected storage location has the greatest playback frequency, or belongs to a memory section of the storage medium having the greatest playback frequency. In this manner, even with automated storage of data groups in the first operating mode, an adaptation to the requirements of the user may be achieved that is as optimal as possible, in that representative data groups are stored in the memory during the first operating mode for the memory section of the storage medium that is reproduced most frequently. This may also ensure that, during reproduction of these data groups in the second operating mode, the user recognizes, as reliably as possible, the selected storage medium, in view of these data groups.

It is believed that a further advantage of an exemplary method according to the present invention is that the number of the data groups stored in the first operating mode in the memory may be selected so that, at the latest after a one-time playback of all the data groups of the storage medium stored in the memory, this storage medium selected in the second operating mode was brought from the magazine into the playback position or into the reject position. In this manner, it may be prevented that the loading process of the storage medium from the magazine into the playback position or the eject position is noticed by the user, since it is ensured during the entire loading process that data groups of the storage medium are reproduced from the memory. This may enhance the operating convenience for the user.

It is believed to be advantageous that the storage medium may be read out and reproduced in the second operating mode, after reaching the playback position and beginning at one storage location that directly follows that storage location, whose data were last read out and reproduced from the memory, before the playback position is reached by the storage medium. In this manner, the playback process begun by reading out the memory in the second operating mode, after the playback position is reached by the storage medium, may be continued without a transition period and uninterrupted, so that the loading process of the storage medium from the magazine into the playback position may remain unnoticed by the user. In the case of storage of audio data of the storage medium, the operating convenience and the listening pleasure me thus be increased considerably during the loading process of the storage medium into the playback position by the magazine.

It is believed that a further advantage of an exemplary method according to the present invention is that the data may be stored in the memory compressed and/or having a reduced sampling rate at reduced data capacity. This may save storage space, and storage cost may be reduced correspondingly.

It is believed that a further advantage of an exemplary method according to the present invention is that, in the first operating mode, a starting time and/or a play duration may be ascertained for the data to be stored in the memory, in dependence upon their storage location in the storage medium, and that the starting time and/or the play duration may be stored as an allocation to the identification data of the storage medium. The storage of starting time and/or play duration may require less storage space than storing data groups of the storage medium, the data groups to be stored in the memory being clearly identified by the starting time and the play duration. Thus, for example, when retrieving the storage medium from the playback unit or the magazine, the data groups may be deleted from the memory to save storage space, the starting time and/or the play duration for these data groups continuing to remain in the memory for identifying the corresponding data groups at a later reintroduction of the storage medium into the playback device or the magazine, and for storing them again on occasion in the first operating mode. Thus, at least data, for identifying data groups to be stored in the memory as needed, may be stored long-term also for as large a number as possible of storage media which may exceed the number of storage spaces in the Magazine.

DETAILED DESCRIPTION

Figure 1:
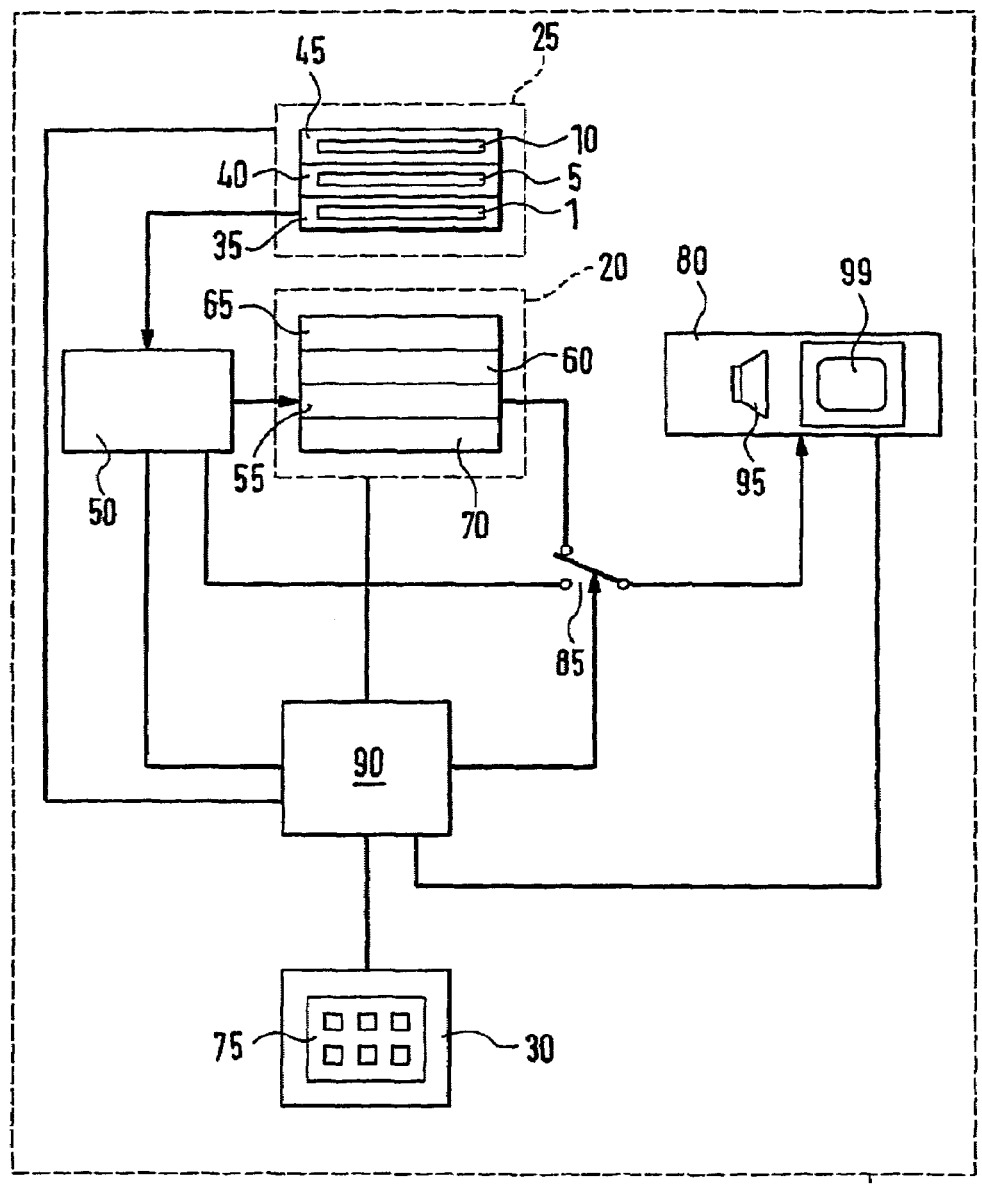
FIG. 1 is a block diagram of a playback device.

In FIG. 1, 15 designates a playback device, which may be configured as a compact disk changer, for example. Playback device 15 includes a magazine 25 having a first magazine space 35, a second magazine space 40 and a third magazine space 45. According to the exemplary embodiment shown in FIG. 1, a first storage medium 1 is stored in first magazine space 35, a second storage medium 5 is stored in second magazine space 40, and a third storage medium 10 is stored in third magazine space 45. Storage media 1, 5, 10 may be, for example, optical storage records in the form of compact disks, CD-ROM's, digital video disks or the like. However, storage media 1, 5, 10 may also be magnetic storage media, such as magnetic storage disks. Digital audio data and/or video data and/or other data may be stored on storage media 1, 5, 10. In the case of storage media 1, 5, 10 being compact disks, digital audio data will be stored on storage media 1, 5, 10. In the case of storage media 1, 5, 10 being digital video disks, digital video data will be stored on storage media 1, 5, 10. However, storage media 1, 5, 10 may be provided with, for example, audio data and/or video data and/or other data stored in magnetic form for storage in magazine 25.

However, storage media 1, 5, 10 may store analog audio data and/or video data and/or other data.

One of magazine spaces 35, 40, 45 is connected to a playback unit 50 of playback device 15. In the exemplary embodiment shown in FIG. 1, first magazine space 35 is connected to playback unit 50. That storage medium 1, 5, 10 whose appertaining magazine space 35, 40, 45 happens to be connected to playback unit 50 may be loaded into playback unit 50 for reading out by a read device (not shown) provided in playback unit 50, and may also be communicated back again from playback unit 50 to appertaining magazine space 35, 40, 45. The connection of playback unit 50 to one of magazine spaces 35, 40, 45 may be influenced by a keyboard 75 of an operating unit 30 via a control unit 90. Playback unit 50 and operating unit 30 are thus connected to control unit 90. In this connection, playback unit 50 together with magazine 25 may also be provided outside playback unit 15, for example, in the form of a compact disk changer. Control unit 90 and operating unit 30 may be positioned, for instance, in an automobile radio connected to the compact disk changer, as control station and operating station. Playback unit 50 is also connected to a memory 20, and may be connected to a reproduction unit 80 via a switch 85, which may be controlled by control unit 90. Reproduction unit 80, just as memory 20, is also connected to control unit 90. In this context, reproduction unit 80 may include one or more loudspeakers 95 for the acoustical reproduction of, for example, digital/analog converted audio data and/or a display device 99 for the reproduction of, for example, digital/analog converted video data and/or other data. Memory 20 may also be connected to reproduction unit 80 via switch 85. At the selection of first storage medium 1 and the corresponding connection of first magazine space 35 to playback unit 50, as shown in FIG. 1, playback unit 50, in a first operating mode, accesses a first storage space 55 of memory 20, which, in a second operating mode, may be connected to reproduction unit 80 via switch 85. Correspondingly, in memory 20, a second storage space 60 is allocated to second magazine space 40, and a third storage space 65 is allocated to third magazine space 45. Memory 20 also includes a memory region 70 for storing specific data concerning storage media 1, 5, 10 stored in magazine 25, and possibly concerning other storage media not stored in magazine 25 or in playback unit 50.

In the first operating mode, data in the form of at least one data group from one of storage medium 1, 5, 10 stored in playback unit 50 are stored in the correspondingly allocated storage space 55, 60, 65 of memory 20. As shown in FIG. 1, first magazine space 35 is connected to playback unit 50, so that, in the first operating mode, first storage medium 1 is transported from first magazine space 35 into playback unit 50, and in playback unit 50 is brought into a playback position in which the data stored on first storage medium 1 may be read out by the read device. The corresponding applies to the connection of the second magazine space 40 to playback unit 50 for the second storage medium 5 or to the connection of third magazine space 45 to playback unit 50 for third storage medium 10. However, this exemplary embodiment according to the present invention will be described in the context of first storage medium 1.

The first operating mode may be set either by a user via keyboard 75, or automatically by control unit 90, for example, during an operating pause of playback unit 15. After setting of the first operating mode, one or more of storage media 1, 5, 10 may be loaded individually into playback unit 50 by the selection of the user via keyboard 75, or, caused by control unit 90. All storage media 1, 5, 10 may be automatically loaded one after another, each individually, into playback unit 50. An exemplary method according to the present invention is described below for the first operating mode in the context of first storage medium 1 loaded in playback unit 50.

After first storage medium 1 in playback unit 50 has been brought into playback position, data of first storage medium 1 are read out by the read device and are stored in first storage space 55. In this regard, memory 20 and its storage spaces 55, 60, 65 may be nonvolatile memories. In the case of the data stored in first storage space 55, at least one data group selected during playback of first storage medium 1 may be involved, which may then be stored in storage space 55. In 20, this regard, for the selection of the at least one data group, two possibilities are provided, although only one of the two possibilities may be provided at a time.

The at least one data group may be selected by the user via keyboard 75 of operating unit 30 from any storage location in first storage medium 1. This selection may also be denoted as "manual selection." During manual selection, first storage medium 1 is played back in playback unit 50. If a passage in first storage medium 1, regarded as distinctive by the user, is played back, he may notify control unit 90 of this during the playback of the passage by the appropriate operation of keyboard 75, whereupon control unit 90 causes the storage of the data present at the selected storage location in first storage space 55. In this context, if the selected at least one data group is present in the middle of a storage section, for example, in a music title of first storage medium 1, control unit 90 may also cause the storage of at least one data group at the beginning of this storage section, such as the beginning of the music title, in first storage space 55.

In addition to manual selection, the at least one data group may be selected by automatic selection. Here, the at least one data group of first storage medium 1, to be stored in first storage space 55, is selected at a predefined storage location in first storage medium 1. This predefinition may, for example, involve a storage location at the beginning of the first storage section of first storage medium 1, such as the beginning of the first music title in a compact disk. Then, at least one data group is read out from a storage location thus predefined, and is stored in storage space 55. This predefinition of the storage location may be suitable for storage media that have been newly introduced into playback device 15 or magazine 25 and have never been played back by playback unit 50.

However, if first storage medium 1 involves a storage medium that has already been played back by playback unit 50, the storage location may also be predefined in dependence upon the frequency of playback of data groups of first storage medium 1 played back before, so that the at least one data group of the predefined storage location has the greatest reproduction frequency, or belongs to a storage section of first storage medium 1 having the greatest reproduction frequency. The reproduction frequency of the data groups or the storage sections of individual storage media 1, 5, 10 or the reproduction points in time required to ascertain them, may, in this context, be stored in storage region 70, in allocation to appertaining storage medium 1, 5, 10. Reproduction points in time lying further back may be rated lower for the ascertainment of reproduction frequencies. At least one of the data groups reproduced most frequently may be stored in first storage space 55 for first storage medium 1, or at least one data group from the beginning of the storage section of first storage medium 1, which is reproduced most frequently, such as the title beginning, of the music title of a compact disk, which is most frequently reproduced, may be filed there.

To save storage space, the data in memory 20 may be filed compressed and/or have reduced sampling rate and/or have reduced data capacity.

In the first operating mode, one may ascertain a starting time and/or play duration for the data of storage media 1, 5, 10 to be filed in memory 20, in dependence of their storage location upon the appropriate storage medium 1, 5, 10. In this regard, using the starting time, one may clearly identify the storage location for the first data group of the corresponding storage medium 1, 5, 10 to be filed in memory 20. Using play duration, one may clearly identify the number of data groups to be filed in memory 20 following the first data group to be filed in memory 20. In this context, ascertaining play duration is, however, only necessary if more than one data group is to be filed in memory 20 for corresponding storage medium 1, 5, 10. Starting time and/or play duration may be stored in storage region 70 in allocation to corresponding storage medium 1, 5, 10. This allocation to corresponding storage medium 1, 5, 10 may be made using identification data that are filed for each storage medium 1, 5, 10 in memory 70 for each storage medium 1, 5, 10, and include characteristic data of the corresponding storage medium 1, 5, 10, such as total playing time and number of storage sections, for example, of titles on one compact disk.

In the second operating mode, the user selects via keyboard 75 one of storage media 1, 5, 10 for playback and for reproduction. Referring to FIG. 1, for example, the user selects first storage medium 1 in first magazine space 35. If first storage medium 1 is already present in playback unit 50, the second operating mode is switched off again, and first storage medium 1 may immediately be read out by the read device of playback unit 50, and thus be played back, so that the data of first storage medium 1 read out by the read device may be reproduced using reproduction unit 80. In this case, control unit 90 causes switch 85 to connect playback unit 50 to reproduction unit 80, so that the data to be reproduced may be transmitted from playback unit 50 to reproduction unit 80.

If, however, storage medium 1 is still in magazine 25, the second operating mode remains activated, and, within a period of time in which selected first storage medium 1 is brought from first magazine space 35 to the playback position in playback unit 50, at least one part of the data filed in first storage space 55 is played back and reproduced by reproduction unit 80. For this purpose, control unit 90 causes switch 85 to connect first storage space 55 to reproduction unit 80, so that the data to be reproduced from first storage space 55 may be reproduced on reproduction unit 80. If the data were filed compressed and/or having a reduced sampling rate and/or having reduced data capacity in memory 20, before reproduction of the data on reproduction unit 80, a corresponding decompression or reprocessing of the data is necessary so that the data may be reproduced without acoustical and/or visual impairment by reproduction unit 80.

It may be provided that the number of data groups filed in the first operating mode in each respective storage space 55, 60, 65 of memory 20 was selected in such a way that, at the latest after one-time playback of all data groups of appertaining storage medium 1, 5, 10 filed in respective storage space 55, 60, 65, this storage medium 1, 5, 10 selected in the second operating mode was brought from magazine 25 into the playback position of playback unit 50. According to the exemplary embodiment shown in FIG. 1, in the second operating mode first storage medium 1 was selected for playback and for reproduction. In this context, in the first operating mode, at least so many data groups of first storage medium 1 were filed in first storage space 55 that, at the latest after one-time playback of all data groups of first storage medium 1 filed in first storage space 55, in the second operating mode, first storage medium 1 was brought from first magazine space 35 into the playback position of playback unit 50. Thus, the loading process of first storage medium 1 into playback unit 50 is not perceived by the user.

Furthermore, it may be provided that first storage medium 1, described as an example in FIG. 1, in the second operating mode and after reaching the playback position in playback unit 50, is read out and reproduced in a storage location that immediately follows that storage location whose data were read out and reproduced last by first storage medium 1 from first storage space 55, before reaching the playback position. In this context, the read device of playback unit 50, with the aid of the starting time stored for first storage medium 1 in storage region 70, in addition to the time required for the loading process for transporting first storage medium 1 from first magazine space 35 into the playback position in playback unit 50, may focus on the storage location of first storage medium 1 resulting from this time summation, provided that the time ascertained for the transport is synchronized with the playback time for the data groups filed in first storage space 55. However, in this context also, after read-out of the data groups from first storage space 55, control unit 90 should activate switch 8s so that, just at the right time before playback of the data of first storage medium 1 read out by the read device of playback unit 50, it connects playback unit 50 to reproduction unit 80, after it had connected first storage space 55 to reproduction unit 80 before, to read out the respective data during the transport of first storage medium 1 from magazine 25 into playback unit 50 from first storage space 55 and to reproduce them on reproduction unit 80.

In this manner, the playback process of data may be switched from first storage space 55 to the playback of first storage medium 1 in playback unit 50, without a transition and without interruption, so that the listening or seeing pleasure of the user may not be impaired and may be started before storage medium 1 reaches the playback position.

The data of the appertaining storage medium 1, 5, 10 filed in one of storage spaces 55, 60, 65 of memory 20 may be deleted when this storage medium 1, 5, 10 is taken out of playback device 15 or from magazine 25. When storage medium 1, 5, 10 is pushed back into playback device 15 or magazine 25, with the aid of the identification data, stored in storage region 70, for identifying storage medium 1, 5, 10, which has been pushed back in, control unit 90 ascertains the appertaining stored starting time and/or play duration also filed in storage region 70. Upon the setting of the first operating mode, the storage location having the appertaining data is ascertained on this storage medium 1, 5, 10, using the starting time and/or play duration. If this storage medium 1, 5, 10 is in the playback position of playback unit 50, these appertaining data are read out and filed in the appertaining storage space 55, 60, 65 of memory 20. It may therefore be sufficient to provide exactly one storage space 55, 60, 65 of memory 20 for each of magazine spaces 35, 40, 45, and still to store in a storage-space-saving way, using the starting times and/or play durations stored in storage region 70, the identification of data groups of storage media that just happen not to be in playback device 15 or in magazine 25. However, in playback device 15 more storage spaces than magazine spaces may also be provided, to be able to store data groups of storage media not filed in playback device 15 or magazine 25, and thus not to be dependent on the storage of starting times and/or play durations for the identification of such data groups, when these storage media are pushed back in.

Additionally or alternatively, depending on the user's input on keyboard 75, the appropriate storage medium 1, 5, 10, in 10 the exemplary embodiment described as in FIG. 1 may be transported to the first storage medium 1, instead of into the playback position of playback unit 50, into an eject position of an insertion/removal port, of playback device 15 or magazine 25, not shown in FIG. 1. During the transport process of the respective storage medium 1, 5, 10 into eject position, the data groups filed in the appertaining storage space 55, 60, 65 are reproduced on reproduction unit 80, for which switch 85 connects the respective storage space 55, 60, 65 to reproduction unit 80, caused by control unit 90. Thus, during the transport of the respective storage medium 1, 5, 10 into the eject position, the user may decide, in view of the data reproduced from memory 20, whether to remove the respective storage medium 1, 5, 10 from playback device 15 or from magazine 25. In this case, it is believed that an automatic system may be the most advantageous, in which, by the operation of an eject button on keyboard 75, control unit 90 transports, one after the other, all storage media 1, 5, 10 from magazine 25, individually in each case into the eject position, and repeats this process cyclically, for example, until the user removes the storage medium currently in the eject position from playback device 15 or from magazine 25 by a renewed operation of the eject button on keyboard 75 or of another button on keyboard 75. In this context, for example, a storage medium, which was not removed from the eject position after the reproduction of all data groups stored in the appertaining storage space, is transported back into magazine 25, and during that time, the data groups for the next storage medium to be transported into the eject position are read out from the appertaining storage space and are reproduced on reproduction unit 80. Thus, during the reproduction, no disturbing pauses are created, which may be caused by the return transport from the eject position to magazine 25, so that the user may decide from the reproduction of the data of the storage medium to be transported next into the eject position concerning its ejection. A selection process for the ejection of a no longer needed storage medium from playback device 15 or from magazine 25 may thus be sped up for the user, so that his operating convenience may be increased.

However, a prerequisite for an uninterrupted reproduction from memory 20 is that the number of data groups filed in memory 20 in the first operating mode is selected for each storage space 55, 60, 65 so that, at the latest after one-time playback of all data groups, filed in each respective storage space 55, 60, 65 in memory 20, of corresponding storage medium 1, 5, 10, this storage medium 1, 5, 10 selected in the second operating mode is brought from the corresponding magazine space 35, 40, 45 into the eject position. The number of data groups filed in the first operating mode in respective storage space 55, 60, 65 may be selected so that, even for the return transport of a storage medium not accepted for ejection, enough data groups are present on the respective storage space for the next storage medium to be transported into the eject position so as to avoid a playback pause during this return transport and an exclusive playback of data groups during the transport of the next storage medium into the playback position. However, if there is insufficient storage space in memory 20, no data groups from memory 20 may be reproduced on reproduction unit 80 during the return transport of a storage medium, not accepted for ejection, from the eject position into magazine 25. Advantageously, however, both the timespan of the return transport of a storage medium, not accepted for ejection, from the eject position into magazine 25, and the timespan required for the transport of the next storage medium from magazine 25 into the eject position are bridged by the playback of data groups of this storage medium, to be brought next into the eject position, from the appertaining storage space of memory 20, and thereby the selection of the storage medium no longer needed in playback device 15 or in magazine 25 may be made easier for the user and sped up.

Figure 2:
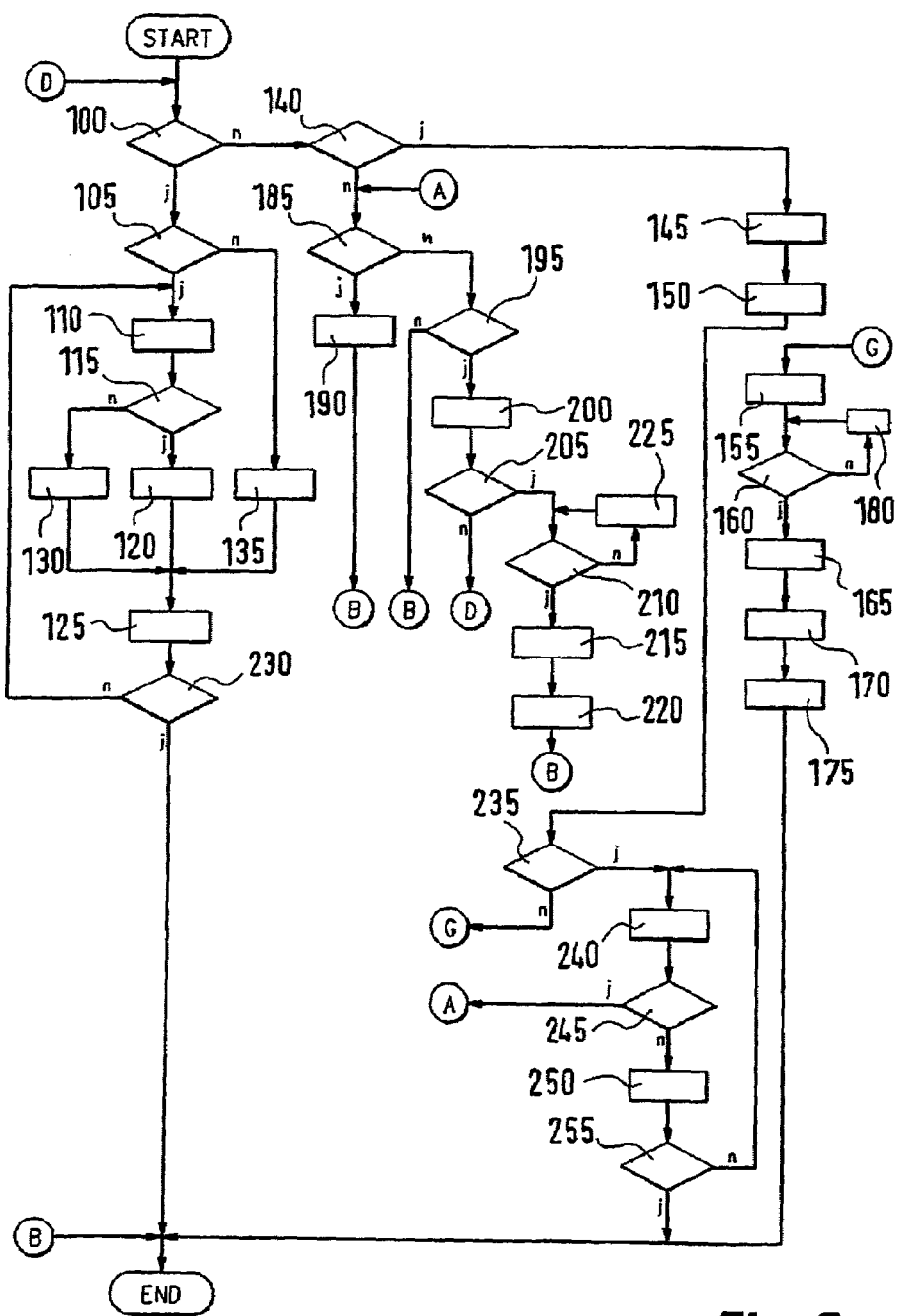
FIG. 2 is a flow chart for the functioning of the control of a playback device.

An exemplary method according to the present invention is shown in FIG. 2, using a flow diagram for control unit 90. At a program point 100, control unit 90 tests whether the first operating mode was set at keyboard 75. If this is the case, the program branches to program point 105, otherwise the program branches to program point 140. At program point 105, control unit 90 tests whether an automatic selection of data groups of one or more storage media 1, 5, 10 filed in magazine 25 is to occur, i.e. whether the user has not selected, via keyboard 75, a storage medium for a manual selection of data groups. If this is the case, the program branches to program point 110, otherwise the program branches to program point 135. At program point 110, control unit 90, which is also connected to magazine 25, causes the transport of one of the storage media 1, 5, 10 into the playback position in playback unit 50, and ascertains from the data filed in storage region 70 which of the data groups of this storage medium was played back before with the greatest frequency by playback unit 50 and was reproduced on reproduction unit 80. Subsequently, the program branches to a program point 115. At program point 115, control unit 90 tests whether several data groups of various storage sections of the storage medium loaded into playback position, having the same frequency, are present. If this is the case, the program branches to program point 120, otherwise the program branches to program point 130. At program point 120, control unit 90 causes the storage of at least one data group at the beginning of the first storage section of the storage medium present in the playback position, for example, at the beginning of the first music title on a compact disk. In this connection, the storage takes place on a storage space of memory 20 allocated to the magazine space of the storage medium currently in the playback position. Subsequently, the program branches to a program point 125. At program point 125, control unit 90 causes the storage of the starting time and/or the play duration of data groups previously stored in memory 20. In this connection, the starting time and/or the play duration are filed in storage region 70, and identification data, such as total play time and the number of storage sections for the storage medium currently in the playback position is allocated. Subsequently, the program branches to a program point 230. At program point 230, control unit 90 tests whether data groups were filed in the allocated storage spaces of memory 20, for all storage media filed in magazine 25 or in playback unit 50. If this is the case, the program is exited, otherwise the program branches back to program point 110, the storage medium present in the playback position being transported back into magazine 25, and a new storage medium being transported from magazine 25 into the playback position.

At program point 130, control unit 90 causes the storage of at least one data group, reproduced most frequently before, of the storage medium currently in the playback position in the appertaining storage space, or it causes the storage of at least one data group at the beginning of the storage section having the greatest reproduction frequency of the storage medium currently in the playback position, for instance, at the beginning of the music title of a compact disk that was previously most frequently reproduced.

At program point 135, control unit 90 causes the storage of at least one data group, of the storage medium currently in the playback position, that was manually preselected by the user via keyboard 75, on the appertaining storage space, or it causes the storage of at least one data group at the beginning of a storage section, selected by the user by the use of keyboard 75, of the storage medium currently in the playback position, in the appertaining storage space.

At program point 140, control unit 90 tests whether the first operating mode was set by the user via keyboard 75. If this is the case, the program branches to program point 145, otherwise the program branches to program point 185. At program point 145, control unit 90 automatically, or by an appropriate input on keyboard 75 by the user, selects one of the storage media 1, 5, 10 in magazine 25. Subsequently, the program branches to a program point 150. At program point 150, control unit 90 causes switch 85 to connect the storage space of memory 20 allocated to the selected storage medium to reproduction unit 80. Control unit 90 also causes access to the at least one data group stored in this storage space, provided such a one is stored there, and its reproduction on reproduction unit 80. Subsequently, the program branches to a program point 235. At program point 235, control unit 90 tests whether the user has given a reject instruction at keyboard 75. If this is the case, the program branches to program point 240, otherwise the program branches to program point 155. At program point 240, control unit 90 causes switch 85 to connect a storage space of memory 20, which is either allocated to a storage medium in magazine 25 automatically selected by control unit 90 or selected by the user on keyboard 75, to reproduction unit 80. Control unit 80 also causes the reproduction of the data stored in this storage space on reproduction unit 80. Additionally, at program point 240, control unit 90 causes the transport of the selected storage medium into the eject position. Subsequently, the program branches to a program point 245. At program point 245, control unit 90 tests whether, within a time predefined, for example, as a function of the data set in the storage space to be read out, a command was entered by the user on keyboard 75 to reject the selected storage medium. If this is the case, the program branches to program point 185, and the user may retrieve the storage medium from the eject position, and otherwise the program branches to a program point 250. At program point 250, the data stored in the appertaining storage space are further read out and the storage medium is transported back from the eject position into magazine 25. Subsequently, the program branches to a program point 255. The number of data groups filed in the appertaining storage space of memory 20 should not, in this context, be selected only in dependence on the for the transport and possibly the return transport of a storage medium between the magazine and the eject position, but the time preselected for the user should also be considered, within which he may come to a decision to eject, even after the eject position is reached by the selected storage medium, so that the data groups of a storage medium filed in a corresponding storage space are each reproduced only once on reproduction unit 80. However, it may also be provided to read out the appertaining storage space cyclically, so that storage space may be saved in memory 20, while putting up with repetition of reproductions on reproduction unit 80. Subsequently, the program branches to a program point 255. At program point 255, control unit 90 tests whether all storage media were offered to the user for an eject decision in the eject position. If this is the case, the program is exited, otherwise the program branches back to program point 240, and a new storage medium is transported into the eject position. The user may be offered the storage media repeated cyclically in the eject position for ejection, for as long a time until the user, by input on keyboard 75, breaks off the process for the selection of a storage medium for ejection from playback device 15 or magazine 25.

At program point 155, control unit 90 causes switch 85 to connect the storage space allocated to the selected storage medium to reproduction unit 80, and causes reproduction unit 80 to reproduce the data stored in this storage space. Furthermore, control unit 90 causes the transport of the selected storage medium from magazine 25 into the playback position. Subsequently, the program branches to a program point 160. At program point 160, control unit 90 tests whether the selected storage medium has reached the playback position. If this is the case, the program branches to program point 165, otherwise the program branches to program point 180. At program point 180, control unit 90 executes a wait loop. The program subsequently branches back to program point 160. At program point 165 control unit 90 ascertains the storage location on the storage medium currently in the playback position which directly follows the storage location whose data were last read out from the appertaining storage space before the storage medium reached the playback position and were reproduced on reproduction unit 80. Control unit 90 thereupon causes the focusing of the read device of playback unit 50 on this ascertained storage location. Subsequently, the program branches to a program point 170. At program point 170, control unit 90 causes switch 85 to connect playback unit 50 to reproduction unit 80. subsequently, the program branches to a program point 175. At program point 175, control unit 90 causes the read-out of data of the storage medium currently in the playback position, beginning with the ascertained storage location and its reproduction on reproduction unit 80. Subsequently, the program is exited.

At program point 185, control unit 90 tests whether a storage medium present in the eject position was removed by the user. If this is the case, the program branches to program point 190, otherwise the program branches to program point 195. At program point 190, control unit 90 causes the deletion of data in that storage space of memory 20, which was allocated to the storage medium removed by the user from the eject position. The program is subsequently exited. At program point 195, control unit 90 tests whether a storage medium was inserted into the insertion/removal port of playback device 15 or magazine 25. If this is the case, the program branches to program point 200, otherwise the program is exited. At program point 200, control unit 90 causes the identification of the inserted new storage medium in the light of the identification data stored in storage region 70, of the total play time and of the number particularly of the storage sections of this storage medium, for instance of the total play time and the number of music titles on a compact disk. Subsequently, the program branches to a program point 205. At program point 205, control unit 90 tests by a comparison of the identification data ascertained from the newly inserted storage medium and the identification data filed in storage region 70, which may also include the total play time and the number of storage sections of storage media filed before in playback device 15 or in magazine 25. If, at program point 205, control unit 90 determines that there is agreement of the identification data of the newly inserted storage medium with the identification data already filed in storage region 70, the program branches to a program point 210, otherwise the program branches back to program point 100. At program point 210, control unit 90 tests whether playback device 15 is in an operating pause. If this is the case, the program branches to program point 215, otherwise the program branches to program point 225. At program point 225, control unit 90 executes a wait loop. The program subsequently branches back to program point 210. At program point 215, control unit 90 causes the transport of the newly inserted storage medium into the playback position.

Subsequently, the program branches to a program point 220. At program point 220, control unit 90 causes the ascertainment of at least one data group of the storage medium currently in the playback position, as allocation to the data stored in storage region 70 for this storage medium, concerning the starting time and/or the play duration of the data groups preselected at an earlier point in time or selected, of the storage medium currently in the playback position. Caused by control unit 90, the at least one data group is then filed in a storage space of memory 20, which is allocated to the magazine space reserved for the storage medium currently in the playback position. The program is subsequently exited.

An exemplary method according to the present invention may be suitable for storing characteristic digital audio data of storage media designed as compact disks present in a playback device 15 designed as a compact disk changer, for example, in the case of compact disk ejection in changers not having magazines, that is, in playback devices 15 in which the magazine 25, as shown in FIG. 1, is integrated into playback device 15, and in which only a single insertion/removal port is provided for playback device 15. In this compact disk changer, it may not be possible, when removing a compact disk, to push out all the compact disks of magazine 25 at once. In this case, the compact disks may only be released for ejection one at a time, via the insertion/removal port of playback device 15.

The invention claimed is:

1. A method for the reproduction of data stored on a storage medium in a playback device, the method comprising:
    filing the data in a memory device during a playback and reproduction operation of the storage medium in a first operating mode;
    selecting the storage medium for transporting into an eject position in a second operating mode; and
    at least one of playing back and reproducing at least a part of the data filed in the memory device within a timespan during which the selected storage medium is brought into an eject position, if the selected storage medium is brought into the eject position.

2. The method of claim 1, wherein at least one data group is selected in the first operating mode during the playback of the storage medium, the at least one data group being filed in the memory device.

3. The method of claim 2, wherein the at least one data group is selected using an operating unit at any one of storage locations on the storage medium.

4. The method of claim 2, wherein the at least one data group is selected at a preselected storage location on the storage medium.

5. The method of claim 4, wherein a number of the data groups filed in the first operating mode in the memory is selected so that, at the latest after a one-time playback of all the data groups of the storage medium filed in the memory device, the storage medium selected in the second operating mode has been one of brought from the magazine into the playback position and brought into the eject position.

6. The method of claim 1, wherein the data filed in the memory device are at least one of compressed, have a reduced sampling rate, and have reduced data capacity.

7. The method of claim 1, wherein the first operating mode includes ascertaining at least one of a starting time and a play duration for the data to be filed in the memory device depending on a storage location of the data on the storage medium, at least one of the starting time and the play duration being stored in allocation to identification data of the storage medium.

8. The method of claim 1, wherein the second operating mode includes reading out and reproducing the storage medium beginning at a storage location that directly follows a storage location whose data were last read out and reproduced from the memory device before the storage medium reached the playback position, the storage medium being read out and reproduced after reaching the playback position.

9. The method of claim 1, wherein the data is at least one of digital audio data and video data.

10. The method of claim 1, wherein the storage medium includes an optical storage disk.

11. The method of claim 1, wherein the memory device includes a nonvolatile memory device.

12. A method for the reproduction of data stored on a storage medium in a playback device, the method comprising:
   filing the data in a memory device during a playback and reproduction operation of the storage medium in a first operating mode;
   selecting the storage medium for the playback and the reproduction operation in a second operating mode; and
   playing back and reproducing at least a part of the data filed in the memory device within a timespan during which the selected storage medium is brought from a magazine into an eject position, from which the selected storage medium may be retrieved from one of the playback device and a magazine.

13. The method of claim 12, wherein the data is at least one of digital audio data and video data.

14. The method of claim 12, wherein the storage medium includes an optical storage disk.

15. The method of claim 12, wherein the memory device includes a nonvolatile memory device.

16. A method for the reproduction of data stored on a storage medium in a playback device, the method comprising:
   filing the data in a memory device during a playback and reproduction operation of the storage medium in a first operating mode;
   selecting the storage medium for the playback and the reproduction operation in a second operating mode; and
   at least one of playing back and reproducing at least a part of the data filed in the memory device within a timespan during which the selected storage medium is one of brought from a magazine into a playback position and brought into an eject position, the data stored on the storage medium being read out by a read device if the selected storage medium is brought from the magazine into the playback position, the selected storage medium being retrieved from one of the playback device and the magazine if the selected storage medium is brought into the eject position, wherein:
      the at least one data group is selected using an operating unit at any one of storage locations on the storage medium,
      the at least one data group is selected at a preselected storage location on the storage medium,
      the storage location is preselected depending on the frequency of reproduction of the at least one data group of the storage medium previously played back, and
      the at least one data group of the preselected storage location one of has the greatest reproduction frequency and belongs to a memory section of the storage medium having the greatest reproduction frequency.

17. A method for the reproduction of data stored on a storage medium in a playback device, the method comprising:
   filing the data in a memory device during a playback and reproduction operation of the storage medium in a first operating mode;
   selecting the storage medium for the playback and the reproduction operation in a second operating mode; and
   at least one of playing back and reproducing at least a part of the data filed in the memory device within a timespan during which the selected storage medium is one of brought from a magazine into a playback position and brought into an eject position, the data stored on the storage medium being read out by a read device if the selected storage medium is brought from the magazine into the playback position, the selected storage medium being retrieved from one of the playback device and the magazine if the selected storage medium is brought into the eject position, wherein the first operating mode includes ascertaining at least one of a starting time and a play duration for the data to be filed in the memory device depending on a storage location of the data on the storage medium, at least one of the starting time and the play duration being stored in allocation to identification data of the storage medium;
   deleting the data of the storage medium filed in the memory device when the storage medium is retrieved from at least one of the playback device and the magazine;
   ascertaining, from the stored identification data, at least one of an appertaining stored starting time and an appertaining play duration upon reinsertion of the storage medium into at least one of the playback device and the magazine;
   ascertaining, using the at least one of the appertaining stored starting time and the appertaining play duration, the storage location having the appertaining data on the storage medium upon setting the first operating mode; and
   reading out and filing the appertaining data in the memory device.

* * * * *